United States Patent [19]
Hant

[11] 3,956,712
[45] May 11, 1976

[54] AREA ELECTRON GUN

[75] Inventor: William Hant, Los Angeles, Calif.

[73] Assignee: Northrop Corporation, Los Angeles, Calif.

[22] Filed: Sept. 16, 1974

[21] Appl. No.: 506,568

Related U.S. Application Data

[63] Continuation-in-part of Ser. No. 329,572, Feb. 5, 1973, abandoned.

[52] U.S. Cl. ................ 331/94.5 PE; 313/396; 313/420; 313/343; 315/5.29; 219/121 EB; 330/4.3
[51] Int. Cl.² ................ H01S 3/22; H01S 3/09
[58] Field of Search ............... 331/94.5; 330/4.3; 313/396, 411, 415, 420, 343; 315/5.29; 219/121 EB

[56] References Cited
UNITED STATES PATENTS

| | | | |
|---|---|---|---|
| 3,302,054 | 1/1967 | Courtan | 313/396 X |
| 3,701,915 | 10/1972 | Tsujimoto | 219/121 EB X |
| 3,746,909 | 7/1973 | Runtzel et al. | 315/30 R |

FOREIGN PATENTS OR APPLICATIONS 2,128,255  12/1971  Germany ........................ 313/400

OTHER PUBLICATIONS

Crocker et al., Electronics Letters, Vol. 8, No. 18, Sept. 7, 1972, pp. 460–461.

Primary Examiner—Robert J. Webster
Attorney, Agent, or Firm—Edward A. Sokolski

[57] ABSTRACT

A plurality of thermionic filaments are arranged in side-by-side relationship. A spreader electrode which may be in the form of a flat plate is placed on one side of the filaments, while an anode is placed on the other side of the filaments, with a grid being interposed between the filaments and the anode. The various aforementioned elements are given dimensions and positioned relative to each other and the voltages thereon adjusted so as to shape the trajectory of the electrons to provide a uniform distribution of electrons at the anode with a minimum dissipation of energy in the grid and spreader electrodes.

11 Claims, 10 Drawing Figures

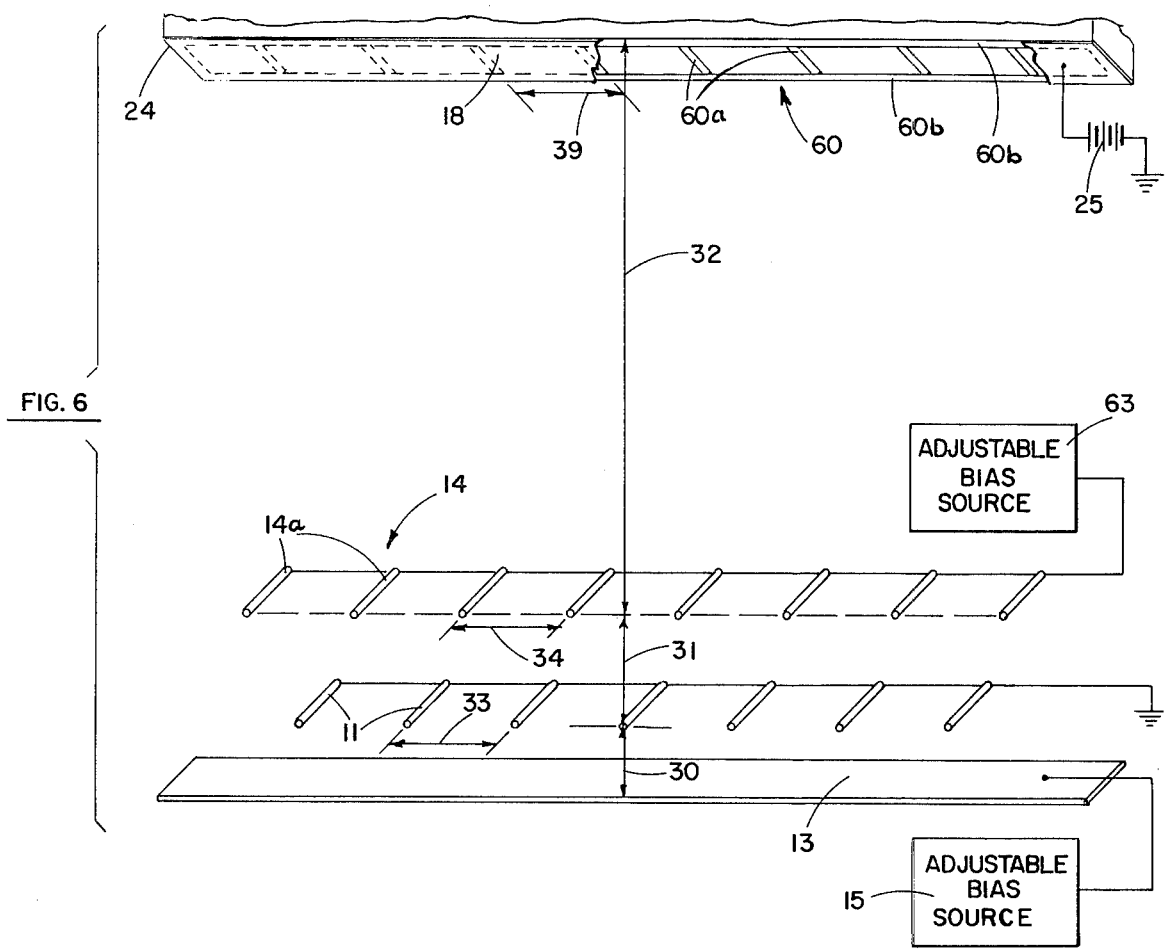
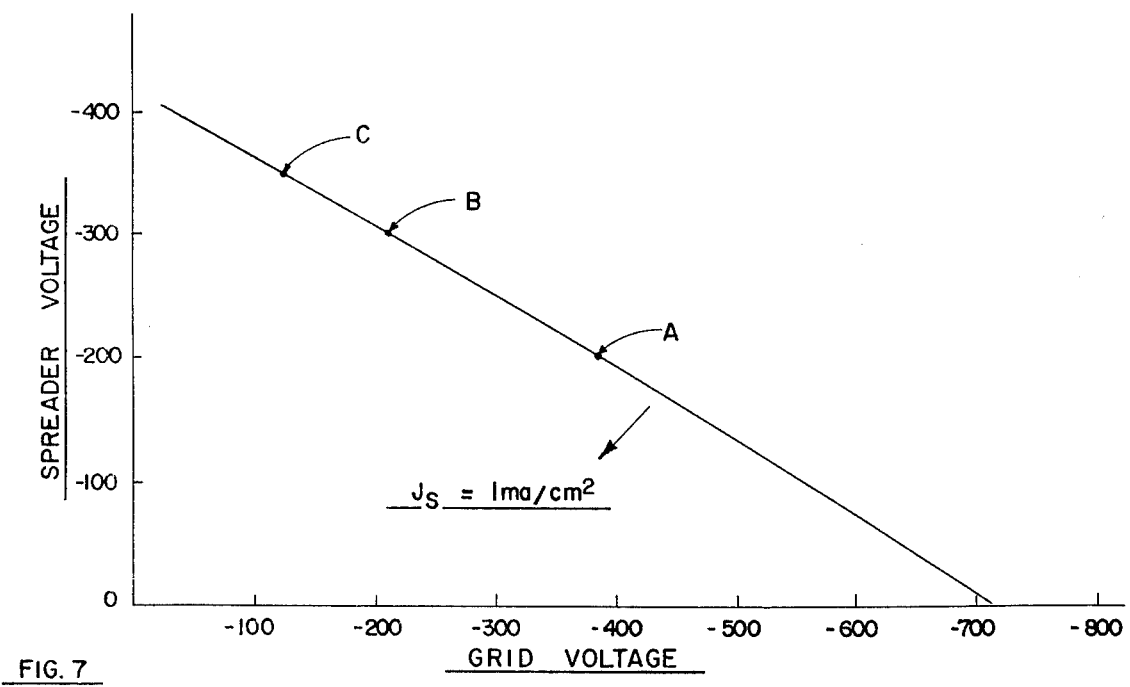

AREA ELECTRON GUN

The application is a continuation-in-part of my application Ser. No. 329,572 filed Feb. 5, 1973 now abandoned.

This invention relates to an area electron gun and more particularly to such a device utilizing thermionic filaments in conjunction with control electrodes which provide a uniform distribution of electrons over a predetermined area.

In gas lasers, such as described in an article by Garnsworthy, Mathias and Carmichael in *Applied Physics Letters* for Dec. 15, 1971, pp. 506–508, the operation of the laser is stabilized by pre-ionizing the laser gas by injecting high energy electrons into the laser volume. For effective ionization, it is important that the electrons are distributed uniformly over the area of the laser cavity. Certain prior art devices have shown inadequacies in this regard. Further, prior art electron guns have tended to be thermally inefficient so that they overheated. Also, outgassing problems have been encountered. Further, in view of the high voltages involved, arcing has at times presented difficulties in certain prior art electron guns.

The device of this invention overcomes the aforementioned shortcomings of the prior art in providing a highly uniform electron flow over a relatively large area. Further, in the device of this invention, thermal efficiency is relatively high, arcing and outgassing problems are minimized.

It is therefore an object of this invention to provide an improved electron gun capable of generating a supply of electrons uniformly distributed over a predetermined area.

It is another object of this invention to facilitate the preionization of a gas laser.

It is still a further object of this invention to provide an area electron gun having higher emission efficiency than similar prior art devices.

Other objects of this invention will become apparent as the description proceeds in connection with the accompanying drawings, of which:

FIG. 6 is a schematic drawing illustrating a second embodiment of the invention;

FIG. 7 is a graph illustrating operating parameters for the second embodiment;

Briefly described, the device of the invention is as follows: A plurality of linear thermionic strip filaments are mounted in parallel alongside each other in a housing. A spreader electrode, which may be in the form of a flat plate, is mounted in the housing behind the filaments, and a grid which may be formed by a plurality of strips in side-by-side relationship in a generally similar arrangement to that of the filaments, is mounted in the housing on the side of the filaments opposite to that on which the spreader is located. Finally, an anode which may be in the form of a flat plate or foil is positioned with the grid between it and the filaments. The various elements are positioned and dimensioned and voltages applied thereto so that the trajectories of the electrons emitted by the filament are shaped to provide a uniform distribution over a predetermined area of the electron current arriving at the anode. The anode may be in the form of a metallic foil which is positioned over a window to the laser cavity such that the electrons penetrate through the foil into such cavity. An embodiment of the invention utilizing beam focusing is also described. This second embodiment is particularly useful with cw operation of the gun where higher average currents are involved than with pulsed operation, the focusing being used to minimize dissipation of energy in the support elements for the anode.

Figure 1:
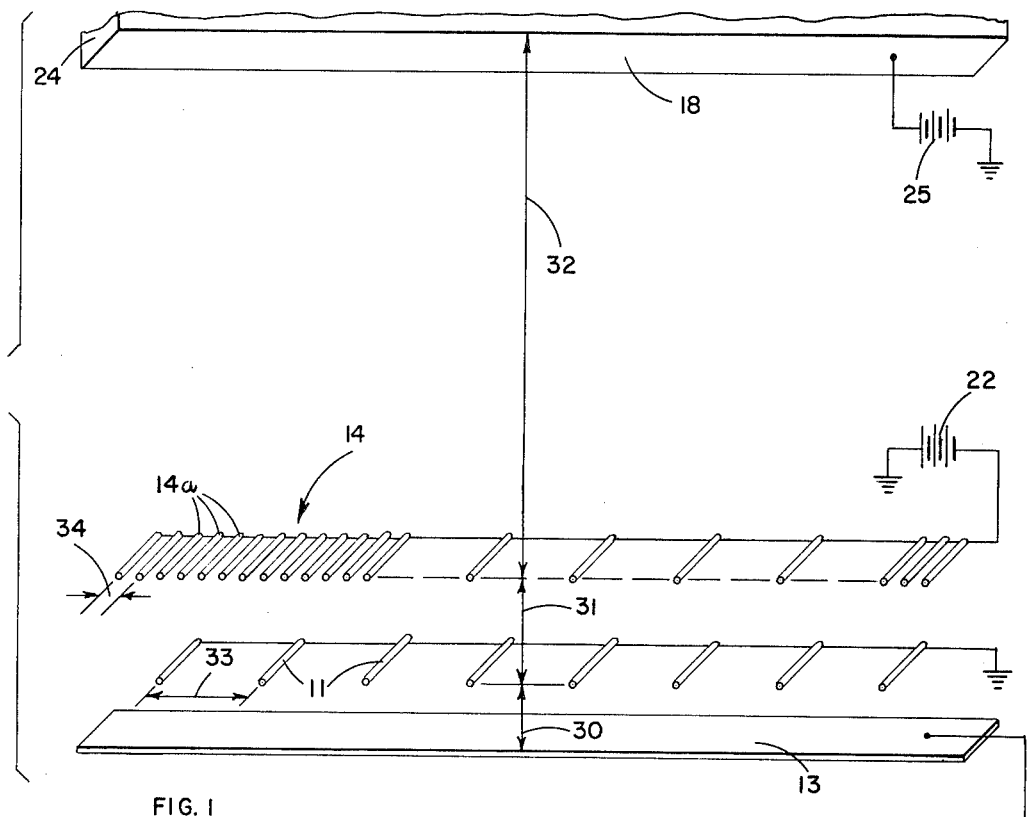
FIG. 1 is a schematic drawing illustrating a first embodiment of the invention.

Referring now to FIG. 1, the electron gun of the invention is schematically illustrated. Thermionic filaments 11 are in the form of electron emissive linear elements arranged substantially parallel to each other in side-by-side relationship. In the illustrative example, the filaments are maintained at substantially zero or ground potential. Spreader electrode 13 may comprise a flat conductive plate which has a width substantially equal to the length of each of the filaments, and a length which covers the extent of all of the filaments. A bias voltage is applied to spreader electrode 13 from adjustable bias source 15, this bias voltage being adjusted to provide optimum distribution of the electrons at anode 18. Grid 14 is formed from a plurality of linear grid strips 14a arranged substantially parallel to each other in spaced relationship. Grid 14 is spaced from the filaments 11 and extends over at least about the same area as the filaments. Grid 14 is placed between filaments 11 and anode 18 and has a negative potential applied thereto from bias source 22. The grid is used to change the effective field of the anode in the area of the filaments so as to control the trajectories of the electrons in conjunction with spreader electron 13. Anode 18 may comprise a conductive foil having an area approximately equal to or greater than that encompassed by the filaments and the grids. Anode 18 may form a septum between the electron gun and a gas filled laser cavity 24, the electrons penetrating through the anode into the cavity to ionize the laser gas.

It is to be noted that it is only necessary that the potentials between the filaments, grid, spreader and anode be maintained in the indicated relationship and the absolute values of these voltages can be adapted to suit particular designs. Thus, for example, the anode can be at zero or ground potential with the other elements below ground.

The dimensions of the various elements and the spacing therebetween are empirically designed for optimum efficiency commensurate with the desired uniform electron distribution at the anode. The diameters of the grid wires should be sufficiently large so that there is no field emission from the grid strips. It is also desirable to maintain the grid as close as possible to the filaments to minimize the size of the package and to minimize transverse field effects at the edges. It is also obviously desirable to minimize dissipation of energy in the grid and the spreader electrode. This end result can be achieved by proper adjustment of the bias voltages on the spreader and grid to control the trajectory of the electrons so that very few of them impinge on the spreader or the grid. To achieve this end result, the bias voltage on the spreader should be close to zero or slightly negative, and the grid is given a negative voltage.

With given dimensional parameters and spacing, design can be empirically optimized by placing a phosphor screen in lieu of the anode at an appropriate spaced position from grid 14 so as to simulate the operation of the anode. As the anode normally has a much higher voltage thereon than an average phosphor screen would have, the position of the phosphor screen must be adjusted accordingly to provide the same effective electric field to the electrons as would the normal anode. With the phosphor screen in the proper position, the voltage output of adjustable bias source 15 can be adjusted until the most uniform illumination of the screen is achieved, this indicating uniform electron distribution. For most uniform current density, this same bias voltage can then be permanently provided to the spreader in normal operation with the regular anode. Usually a range of bias voltages will provide a good current distribution.

In an operating embodiment of the invention, the following voltages were applied to the various elements during its pulsed or energized periods:

| | |
|---|---|
| Voltage differential applied from power source 25 between anode 18 and filaments 11 | 200 kv |
| Voltage output of bias source 22 to grid 14 | −226 volts |
| Voltage on one side of filaments | 0 volts |
| Voltage on spreader electrode from adjustable bias source 15 | 0 volts |

The following dimensional parameters were used in this embodiment:

| | | |
|---|---|---|
| Diameter of filaments | 3 | mils |
| Diameter of grids | 30 | mils |
| Spacing 30 between spreader and filament | .7 | cm |
| Spacing 31 between filament and grid | 1.1 | cm |
| Spacing 32 between grid and anode | 6.9 | cm |
| Spacing 33 between filaments | 1 | cm |
| Spacing 34 between grid elements | .5 | cm |

It is to be noted that in certain situations it may be desirable to operate the gun with a negative potential relative to the filaments on the spreader electrode as well as the grid.

Figure 2:
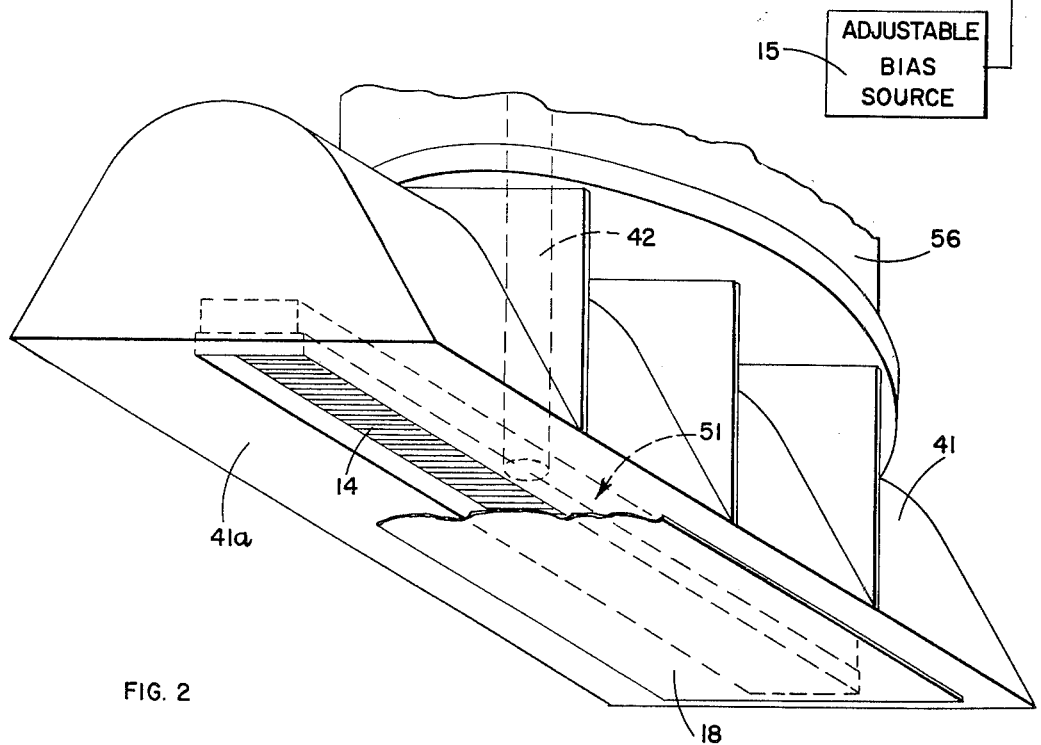
FIG. 2 is a perspective view illustrating the first embodiment of this invention.
Figure 3:
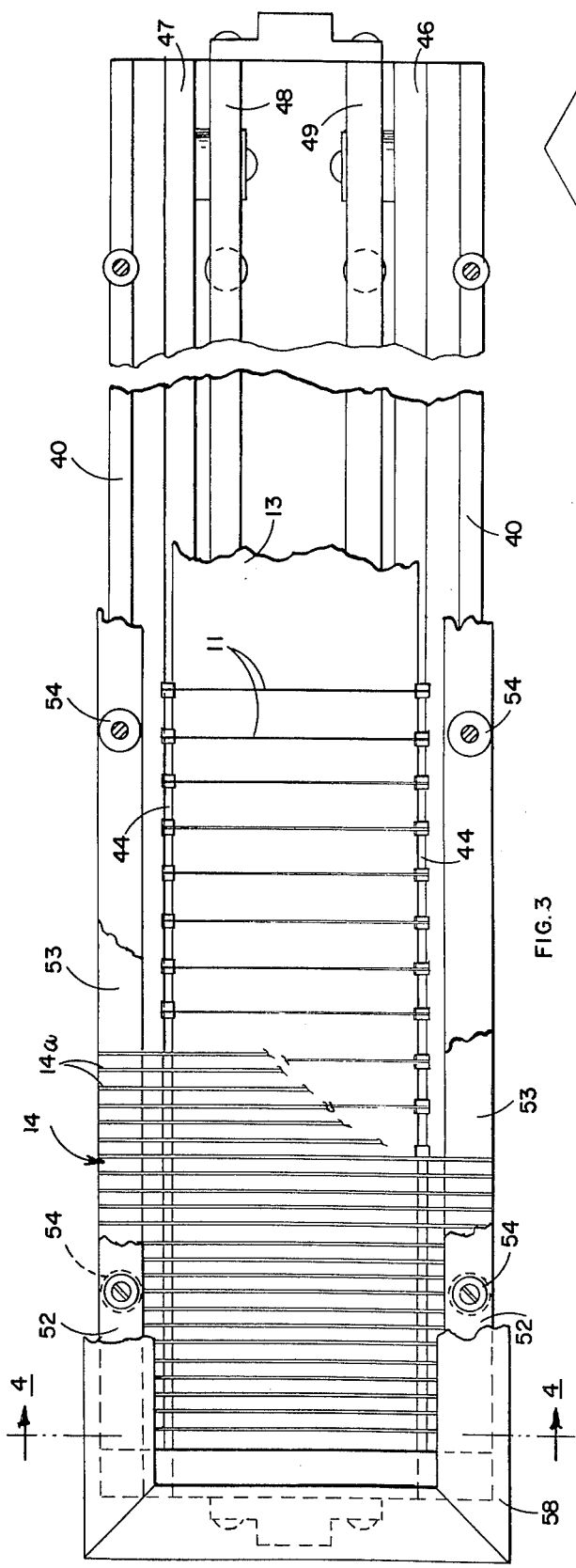
FIG. 3 is a plan view with partial cut-away sections of the embodiment of FIG. 2.
Figure 5:
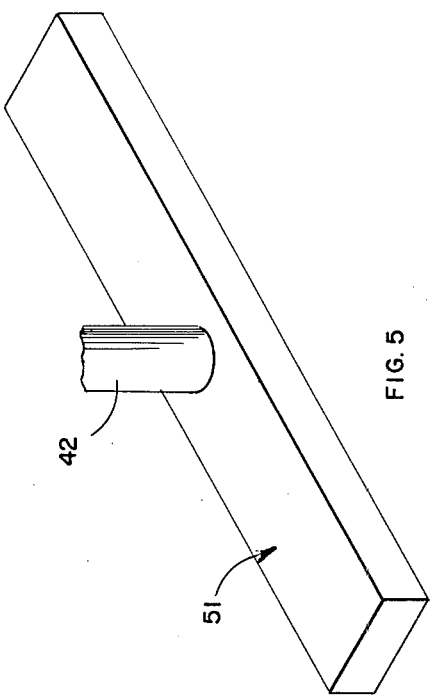
FIG. 5 is a perspective view illustrating the top portions of the embodiment of FIG. 2.
Figure 4:
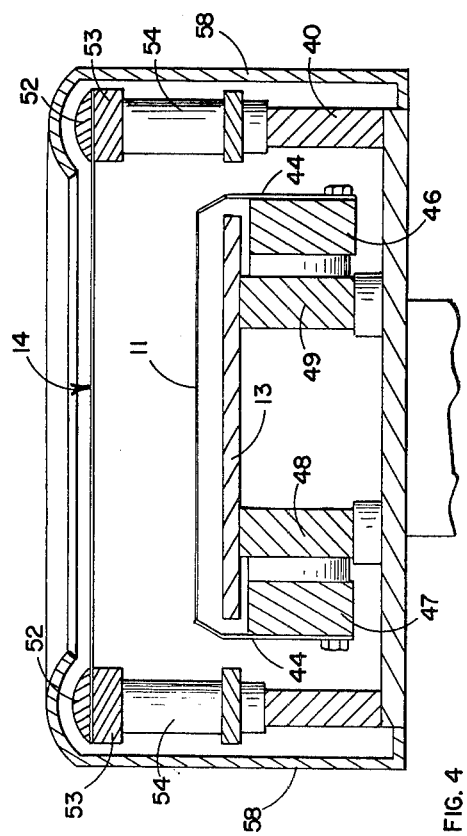
FIG. 4 is a cross-sectional view taken along the plane indicated by 4—4 in FIG. 3.

Referring now to FIGS. 2–5, one embodiment of the invention is illustrated. Assembly 51 is mounted within housing 41 being suspended from the walls of chamber 56 by means of cylindrical support member 42 and appropriate brackets (not shown), with grid 14 recessed behind bottom wall 41a of the housing. In view of the high operating potentials between assembly 51 and the anode 18 (connected to housing 41) provisions must be made to properly electrically insulate housing 41 from assembly 51. Referring now specifically to FIGS. 3 and 4, the filaments 11 are formed by linear wires which are supported between and electrically connected to elongated terminal strips 44. The terminal strips 44 are supported on bars 46 and 47 respectively. Terminal strips 44 are connected to a source of voltage (not shown) for heating the filaments. Filaments 11 may be of tungsten, thoriated tungsten, or a suitable metal oxide. Mounted in close proximity to filaments 11 is spreader plate 13 which is supported on frame 40 on elongated bars 48 and 49. Grid 14, which includes a plurality of grid wires 14a in side-by-side parallel arrangement, is mounted on the casing between strips 52 and 53, these strips being bolted to insulative pillars 54. Metallic shield assembly 58 is attached to frame 40 to provide electrical shielding for assembly 51.

An assembly is thus provided wherein spreader plate 13, filaments 11 and grid 14 are maintained in spaced relationship from each other on a casing which may be mounted as indicated in FIG. 2 to provide a uniform source of electrons at anode 18. Anode 18, which may be in the form of thin metallic foil, is placed over the end of housing 41 as shown in FIG. 2 to provide a septum between the electron gun and the gas filled laser cavity, appropriate means being provided to effect a gas tight seal between these two members. Casing 40 is recessed in housing 41 so that the desired spaced relationship is provided between anode 18 and grid 14.

In typical operation of this first described embodiment, either the grid or spreader may be pulsed to provide pulsating operation of the gun with a low-duty cycle.

Referring now to FIG. 6, a second embodiment of the invention is schematically illustrated. This second embodiment is similar to the first except that the electrons emitted from the gun are focused so that they strike the anode at points between the support structure elements therefor. This minimizes the dissipation of energy in such support structure and minimizes the heating thereof. The second embodiment is particularly significant where there is high average power, as in the case of CW operation.

To support foil anode 18 a ladder structure 60 is utilized which is formed from a pair of side bars 60b, having cross members 60a extending therebetween and spaced along the extent of side bars 60b. This "ladder" forms a web support structure which facilitates the formation of a vacuum tight seal by the foil and also operates as a heat sink to dissipate some of the heat energy developed in the foil. In the preferred embodiment of FIG. 6, the cross bar members 60a are aligned both horizontally and vertically with the grid elements 14a, there being a cross bar 60a for each grid element, the grid elements also having a uniform spacing therebetween which is the same as the spacing between the support bar elements. The filament elements 11 are spaced halfway between grid elements 14a and are oriented horizontally parallel to the grid and bar elements.

As adjustable bias source 15 is provided for spreader 13 while an adjustable bias source 63 is provided for grid 14. A fixed potential is supplied to foil anode 18 from power source 25.

The electrons are focused so that they strike anode 18 at points therealong between cross bars 60a, this end result being achieved by selective adjustment of the spreader and grid voltages by means of adjustable bias sources 15 and 63 respectively.

The following dimensional parameters may be used for the embodiment of FIG. 6:

| | |
|---|---|
| Diameter of filaments 11 | 5 mils |
| Diameter of grid elements 14a | 50 mils |
| Spacing 30 between spreader 13 and filament elements 11 | .667 mils |
| Spacing 31 between filament elements 11 and grid elements 14a | 1 cm |
| Spacing 32 between grid elements 14a and anode 18 | 15.24 cm |
| Spacing 33 between filament elements 11 | .4 cm |
| Spacing 34 between grid elements 14a | .4 cm |
| Spacing 39 between bar elements 60a | .4 cm |

Figure 8A:
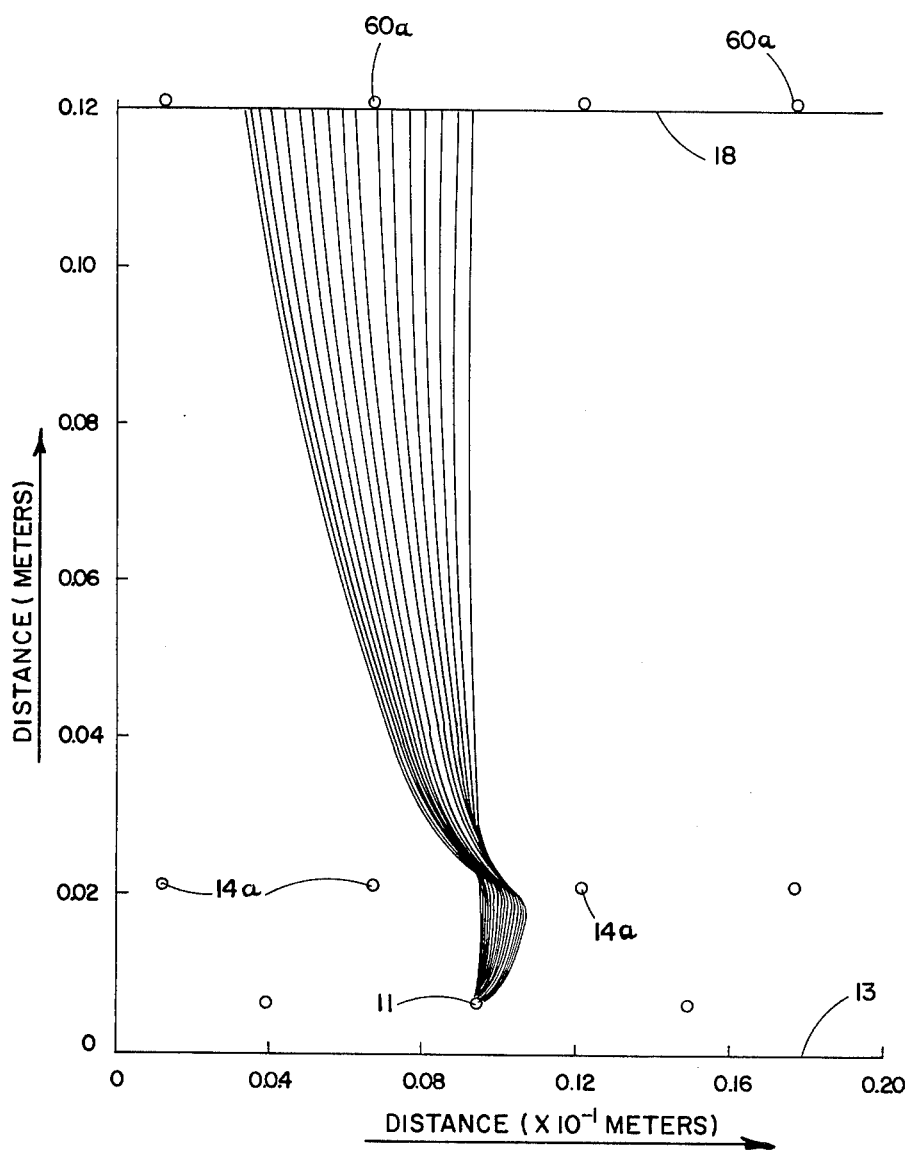
FIG. 8A is a schematic drawing illustrating electron trajectories for one set of operating parameters selected from FIG. 7.
Figure 8C:
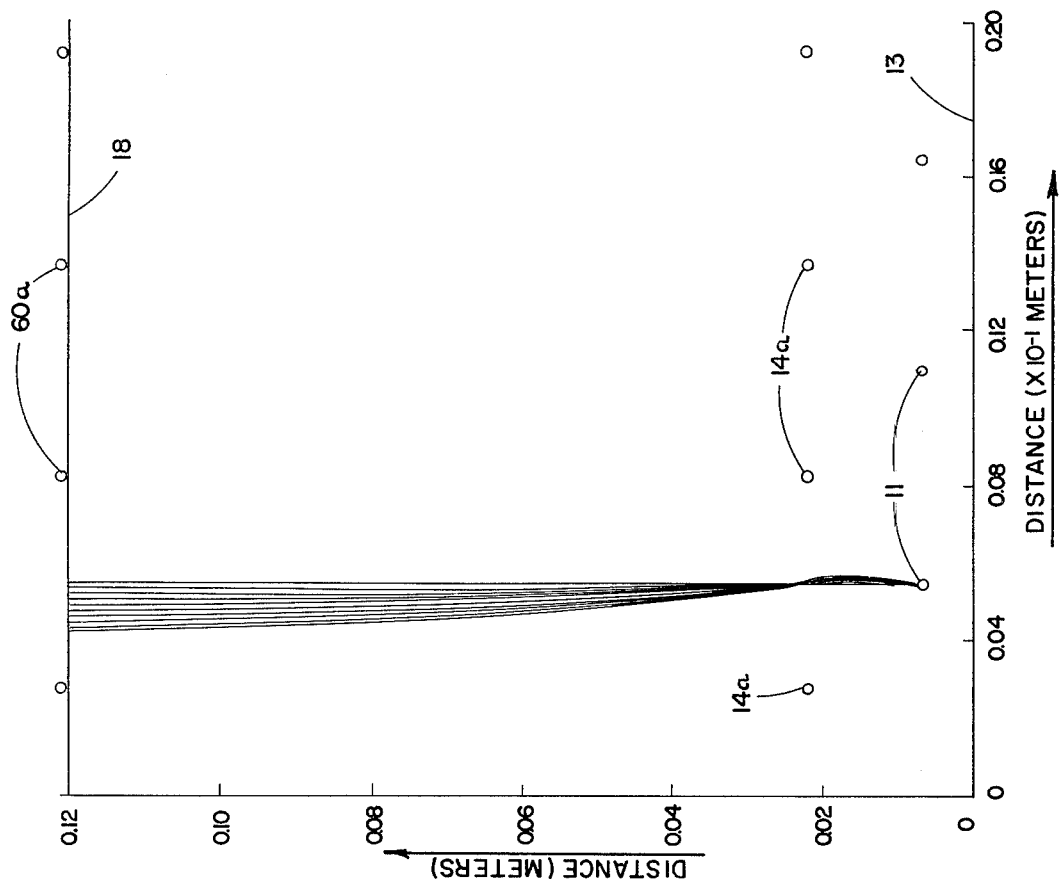
FIG. 8C is a schematic drawing illustrating electron trajectories for a third set of parameters selected from FIG. 7.
Figure 8B:
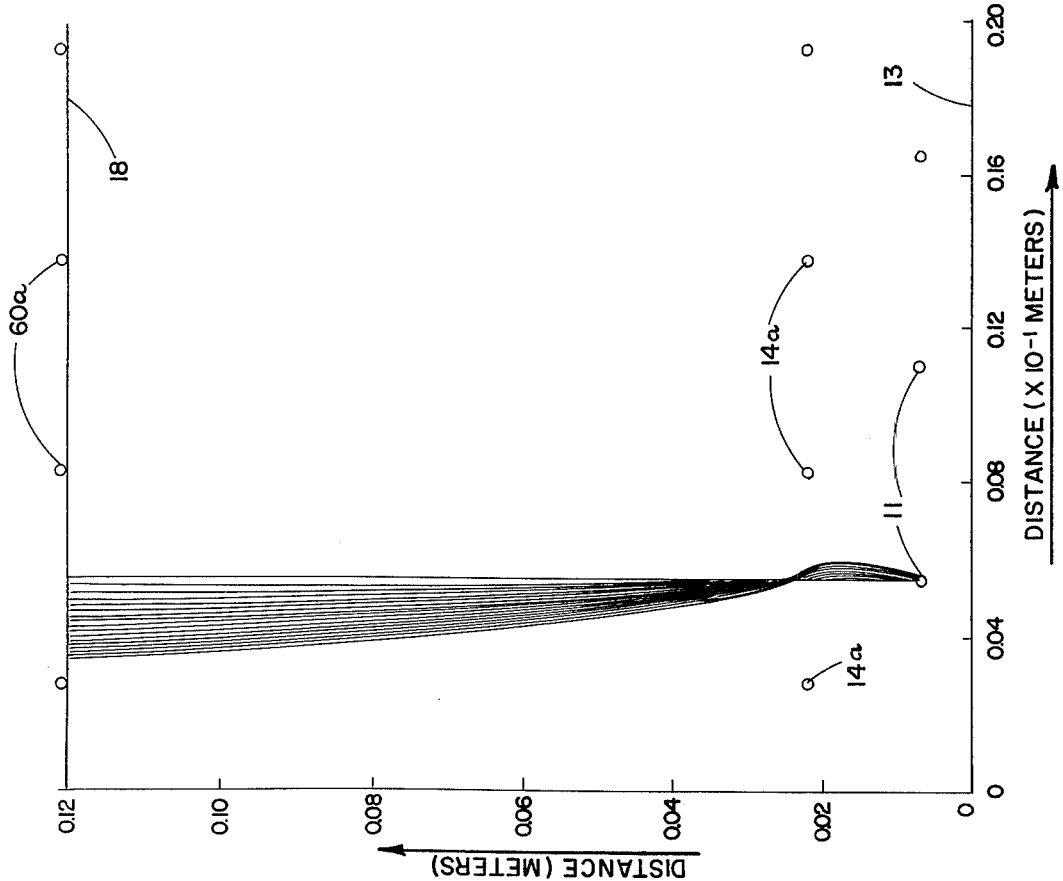
FIG. 8B is a schematic drawing illustrating electron trajectories for a second set of parameters selected from FIG. 7.

Referring now to FIG. 7, various combinations of spreader and grid voltages for an anode current density of 1MA/cm$^2$ are illustrated for the embodiment of FIG. 6, having the parameters as just set forth. The values shown in the curve are with a fixed anode voltage of 2.0 × 10$^5$ volts. The focusing action attained when operating at points A, B, and C of the 1MA/cm$^2$ curve of FIG. 7 are illustrated respectively in FIGS. 8A, 8B and 8C. FIGS. 8A, 8B and 8C schematically illustrate the trajectories of the electrons emitted by one of the filament elements 11 and traversing the distance between the filament and anode 18. As illustrated in FIG. 8A at operating point A of FIG. 7, little focusing is achieved and the electrons are spread so that there is no concentration thereof between bar elements 60a. As shown in FIG. 8B at operating point B of FIG. 7, focusing of the electrons between bar elements 60a is achieved. Finally, referring to FIG. 8C operation at point C of FIG. 7 is shown whereby the electrons are even more effectively focused between cross bars 60a so that none of the electrons strike these bars, thereby avoiding dissipation of energy therein.

It is to be noted that while the electron gun of the invention has been described in connection with gas lasers, it could also be used to advantage in other applications involving high energy electron beam radiation, such as in certain medical, biological and chemical processes.

The device of this invention thus provides efficient means utilizing a thermionic cathode for providing a uniform source of electrons over a relatively large area, which is useful for ionizing the gas in a gas laser cavity.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. An area electron source for use in preionizing the gas in a gas filled laser cavity comprising:
    a plurality of linear thermionic strip filaments for emitting electrons arranged alongside each other in a first predetermined plane,
    a spreader electrode consisting of a flat plate positioned in a second predetermined plane parallel to said first plane on one side of said filaments,
    a grid comprising a plurality of conductive wires arranged spaced from each other in side by side parallel relationship in a third predetermined plane parallel to said first and second planes and on the other side of said filaments,
    an anode comprising a flat metal foil positioned in a fourth predetermined plane parallel to said aforementioned planes on the side of the grid away from the filaments, said foil forming a septum between the electron source and the laser cavity, the electrons penetrating through said foil into the laser cavity, and
    means for applying predetermined voltages to the filaments, grid, anode and spreader electrode to cause the electrons emitted by said filaments to have a trajectory towards said anode such as to provide a uniform distribution of said electrons at said anode, the voltage applied to the grid being negative with respect to the voltage applied to the filaments.

2. The electron source of claim 1 wherein said spreader electrode and said grid extend over an area at least approximately as great as that encompassed by said filaments.

3. The electron source of claim 1 wherein substantially the same potential is applied to the filaments and the spreader electrode.

4. The electron source of claim 1 wherein a negative potential is applied to the spreader electrode with respect to the potential applied to the filaments.

5. An area electron source for use in preionizing the gas in a gas filled laser cavity comprising:
    an elongated rectangular casing,
    a flat conductive spreader plate mounted on said casing,
    a plurality of thermionic filaments mounted side by side to each other on said casing in spaced relationship to the surface of said spreader plate, said filaments being positioned in a plane parallel to the surface of the spreader plate,
    a grid comprising a plurality of conductive parallel linear elements mounted on said casing side by side spaced from each other and in spaced relationship to said filaments, said grid being positioned in a plane parallel to that of said filaments,
    an anode in the form of a flat metal foil positioned in spaced relationship with said grid on the side thereof opposite to that facing the filaments, the broad surface of said anode being in a plane parallel to that of said grid, said foil forming a septum between the electron source and the laser cavity, the electrons penetrating through the foil into the cavity, and
    means for applying predetermined voltages to the filaments, grid, anode and spreader electrodes to cause the electrons emitted by the filaments to have a trajectory towards the anode such as to provide uniform distribution of the electrons at the anode, the voltage applied to the grid being negative with respect to that applied to the filaments.

6. The electron source of claim 5 wherein the area encompassed by said grid and said spreader electrode is approximately as great as that encompassed by said filaments.

7. The electron source of claim 5 and further including a housing in which said casing is mounted, said casing being recessed behind an opening in one surface of said housing so that the plane of said grid is below said housing surface, the anode being placed against the last mentioned surface.

8. The electron source of claim 5 and further including a support structure including support bars for supporting said foil, said support bars being positioned in a plane parallel to that of said anode and aligned both horizontally and vertically with said grid elements, there being the same number of support bars as grid elements, said filaments being horizontally spaced halfway between said grid elements.

9. The electron source of claim 8 wherein the spacing between each of the grid elements, each of the filaments and each of the support bars is the same.

10. The electron source of claim 8 wherein said support structure is in the form of a ladder, the support bars forming the cross bars of said ladder.

11. The electron source of claim 8 and further including an adjustable bias source for said spreader plate and an adjustable bias source for said grid, said bias sources being adjusted to provide voltages to the grid and spreader plate whereby the electrons emitted by said filaments are focused to strike said anode at points between the support bars.

* * * * *